United States Patent

Myers et al.

[11] Patent Number: 5,097,864
[45] Date of Patent: Mar. 24, 1992

[54] ADJUSTABLE FLOW POPPET VALVE FOR INJECTION MOLDING

[75] Inventors: Jeffrey A. Myers, Saline; Jeffrey A. Kuhman, Tecumseh, both of Mich.

[73] Assignee: Great Lakes Feedscrews, Inc., Tecumseh, Mich.

[21] Appl. No.: 678,727

[22] Filed: Apr. 1, 1991

[51] Int. Cl.⁵ .............................................. F16K 15/06
[52] U.S. Cl. ................................ 137/528; 137/533.17; 425/562
[58] Field of Search .............. 137/528, 533.17, 533.21, 137/533.23; 425/562, 563

[56] References Cited

U.S. PATENT DOCUMENTS

| 1,029,931 | 6/1912 | Jensen | 137/533.17 |
| 1,978,730 | 10/1934 | Weber | 137/528 X |
| 3,438,393 | 4/1969 | Godley | 137/533.17 |
| 3,590,439 | 7/1971 | Swanson | 137/533.17 |
| 3,744,751 | 7/1973 | Robinson | 137/540 X |
| 4,380,422 | 4/1983 | Von Holdt | 425/562 X |

Primary Examiner—Robert G. Nilson
Attorney, Agent, or Firm—William J. Clemens

[57] ABSTRACT

A check valve for use in controlling the flow of thermoplastic material in an injection molding apparatus includes a valve body having an axially extending chamber formed therein with an inlet opening and an outlet opening through which the material can flow. An poppet is slidably movable in the chamber between a valve closed position and a selected valve open position. The poppet has an inlet end with a conical shape and the chamber has a complementary taper portion adjacent the inlet opening, the inlet end and the taper portion sealingly cooperating for preventing flow of material through said chamber when said poppet is in the valve closed position. An adjusting ring is positioned in the chamber for selective movement between a minimum open position and a maximum open position, the adjusting ring being externally threaded for threadably engaging an internal thread formed in the chamber. The poppet has a plurality of radially extending tabs formed thereon for abutting the adjusting ring when the poppet is in the selected valve open position whereby the volume of flow of material through the chamber is proportional to the position of the adjusting ring in the chamber. The poppet also has a plurality of axially extending grooves formed therein for permitting the flow of material from the inlet end of the poppet to an opposite end of the poppet and out the outlet end of the chamber.

12 Claims, 2 Drawing Sheets

ADJUSTABLE FLOW POPPET VALVE FOR INJECTION MOLDING

BACKGROUND OF THE INVENTION

The present invention relates generally to non-return check valves and, in particular, to an adjustable flow poppet valve for use at the nozzle of an injection molding apparatus.

Typically, bulk plastic material is fed into an extruder or injection molding machine or a blow molder through a barrel or cylinder utilizing a rotating helical screw. Such a machine is operated at an elevated temperature and, if it is required to be shut down, the plastic material tends to solidify.

Typically, a check or poppet valve is installed between the feedscrew and the nozzle of an injection molding machine to control the plastic material flow during each cycle. When the feedscrew is operated to force material through the nozzle, the pressure of the advancing material forces the check valve open and plastic material flows through the check valve and through the nozzle to supply the associated mold. When the desired amount of plastic material has flowed into the mold, the feedscrew is moved forward in an injection stroke forcing the poppet in the poppet valve to move in a rearward direction closing the valve and preventing back flow of the material.

One form of non-return check valve used for an injection molding machine is disclosed in U.S. Pat. No. 3,438,393. The check valve has a moveable member with a first sealing portion supported in a main valve body having a second sealing portion, the moveable member being moveable between a first position in which the sealing portions cooperate to prevent the flow of thermoplastic material past the moveable member, and a second position in which the sealing portions are spaced to allow flow of thermoplastic material past the moveable member. The moveable member has a stop portion, and a retaining member is located in the path of the stop portion, spaced forwardly of the stop portion when the moveable member is in its first position so as to prevent forward movement of the moveable member beyond its second position. A retaining portion or passage in the main valve body loosely holds or retains the retaining member in the main valve body while being substantially larger than the retaining member to allow substantial flow of thermoplastic material between the walls of the passage and retaining member. The retaining passage can be a bore, the retaining member can be a pin located in the bore and spaced from its inside surface and a moveable groove poppet can be provided, the pin passing through the poppet, the front of the poppet acting as an injection head.

SUMMARY OF THE INVENTION

The present invention concerns an apparatus for controlling the flow of thermoplastic material in an injection molding operation. A check valve is positioned between the feedscrew and the mold apparatus and includes a valve body having an axially extending chamber formed therein with an inlet opening and an outlet opening through which the material can flow. A poppet is slidably movable in the chamber between a valve closed position and a selected valve open position. The poppet has an inlet end with a conical shape and the chamber has a complementary taper portion adjacent the inlet opening, the inlet end and the taper portion sealingly cooperating for preventing flow of material through said chamber when said poppet is in the valve closed position.

An adjusting ring is positioned in the chamber for selective movement between a minimum open position and a maximum open position, the adjusting ring being externally threaded for threadably engaging an internal thread formed in the chamber. The poppet has a plurality of radially extending tabs formed thereon for abutting the adjusting ring when the poppet is in the selected valve open position whereby the volume of flow of material through the chamber is proportional to the position of the adjusting ring in the chamber. The poppet also has a plurality of axially extending grooves formed therein for permitting the flow of material from the inlet end of the poppet to an opposite end of the poppet and out the outlet end of the chamber.

The adjusting ring includes means for rotating the ring relative to the valve body. In one embodiment, the means for rotating includes a pair of diametrically opposed axially extending apertures formed in an end of the adjusting ring for engagement by a wrench. In another embodiment, the means for rotating includes a pair of diametrically opposed flats formed on an exterior surface end of the adjusting ring for engagement by a wrench.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
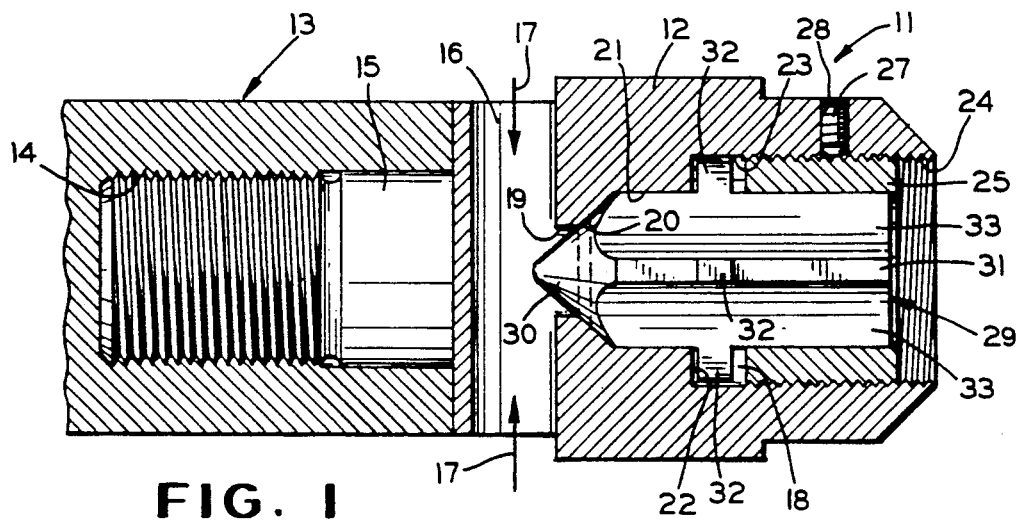
FIG. 1 is a front elevational view in cross section of a portion of an injection molding feedscrew apparatus including a poppet valve in accordance with the present invention in a closed position.
Figure 2:
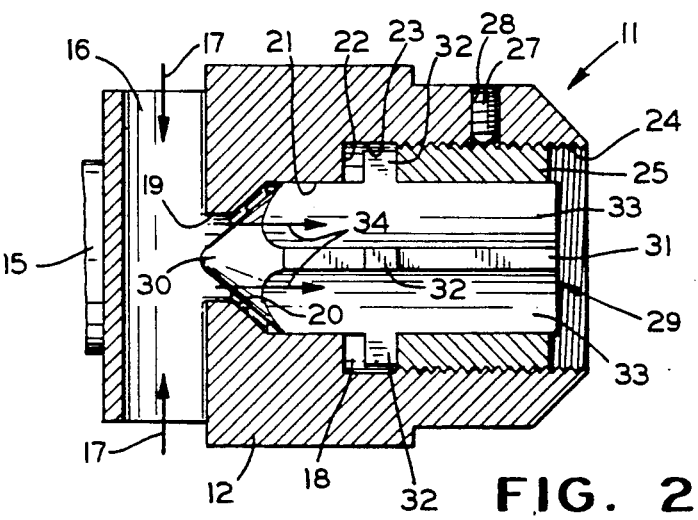
FIG. 2 is a view similar to the FIG. 1 with the valve in a minimum travel open position.
Figure 3:
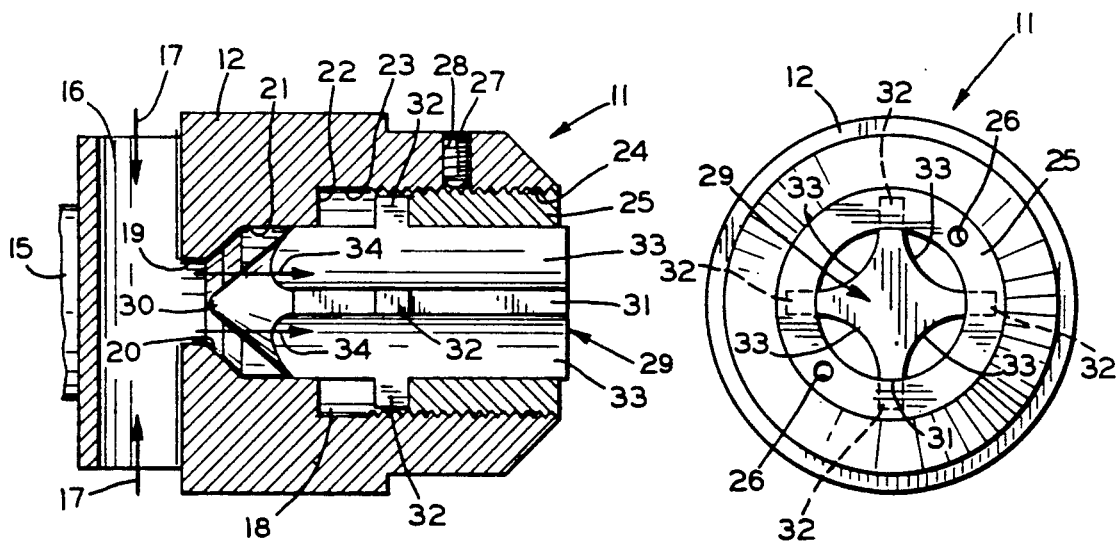
FIG. 3 is a view similar to the FIG. 1 with the valve in a maximum travel open position.
Figure 4:
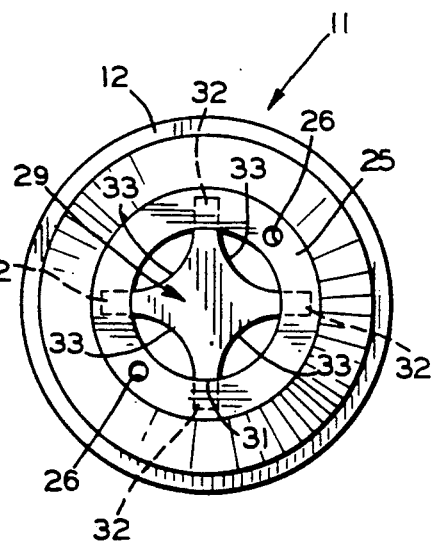
FIG. 4 is an end view of the outlet end of the valve shown in the FIG. 1.

There is shown in the FIGS. 1–4 a poppet valve 11 having a valve body 12 releasably attached to an end of an injection molding feedscrew 13. An axially extending internally threaded aperture 14 is formed in an end of the feedscrew 13. A generally cylindrical axially extending mounting post 15 is attached to an inlet end of the valve body 12. The mounting post 15 is externally threaded to cooperate with the internally threaded aperture 14 and releasably retain the poppet valve 11 on the end of the feedscrew 13.

Formed in the inlet end of the valve body 12 is a radially extending passageway 16. As the feedscrew is rotated, thermoplastic material is fed toward the valve 11 and enters the passageway 16 flowing in the direction of arrows 17. Formed in the valve body 12 is an axially extending bore or chamber 18. The chamber 18 is open at one end to the passageway 16 and at the opposite end forms an outlet for the valve 11. Adjacent the passageway 16, the chamber is formed as a relatively small diameter inlet opening 19. The inlet opening 19 is adjacent a taper portion 20 which tapers upwardly and toward the outlet of the chamber 18 from the diameter of the inlet opening 19 to a larger diameter poppet bore 21. The poppet bore 21 extends toward the outlet end of the chamber 18 a short distance to a radially outwardly extending step 22 which functions as a stop for the poppet in the closed position of the valve. The step 22 also provides a transition from the smaller diameter poppet bore 21 to a larger diameter ring bore 23. The ring bore 23 extends from the step 22 to an outlet opening 24 of the chamber 18.

The ring bore 23 is internally threaded over a substantial portion of its length from the outlet opening 24 toward the step 22. The ring bore 23 threadably retains an externally threaded adjusting ring 25 which is infinitely adjustable between a minimum setting adjacent the step 22 as shown in the FIGS. 1 and 2, and a maximum setting farthest from the step 22 as shown in the FIG. 3. The adjusting ring 25 can be rotated between the maximum and minimum settings through the use of a conventional "Y-shaped wrench" (not shown) having a pair of pins which cooperate with diametrically opposed apertures 26 formed in an outer end of the adjusting ring 25 as shown in the FIG. 4. When the adjusting ring 25 has been rotated into position, it can be retained in place utilizing a set screw 27 threadably retained in a threaded aperture 28 extending radially between an outer surface of the valve body 12 and the threaded inner wall of the chamber 18.

Positioned in the chamber 18 is a poppet 29 having a conical inlet end 30. As shown in the FIG. 1, the inlet end 30 is tapered to be complementary to and cooperate with the taper portion 20 of the chamber 18 to seal and prevent the flow of thermoplastic material from the passageway 16 to the outlet opening 24.

The poppet 29 has a generally cylindrical central body portion 31 of a diameter which slidably cooperates with the poppet bore 21 and an internal surface of the adjusting ring 25 to seal against the flow of thermoplastic material. Extending radially outwardly from the central body 31 are a plurality of tabs 32 such as four equally spaced tabs 32. In the closed position of the valve 11 shown in FIG. 1, the tabs 32 are adjacent to but spaced from the step 22 to permit sealing contact between the conical inlet end 30 and the taper portion 20 of the chamber 18. In the open position of the valve 11, as shown in the FIGS. 2 and 3, the tabs 32 abut the adjacent end of the adjusting ring 25 to define the maximum travel of the poppet 29 between the closed and open positions.

The poppet 29 is also provided with a plurality of axially extending grooves 33. The grooves 33 extend below the external surface of the central body portion 31 and provide a passage for thermoplastic material between the conical inlet end 30 and the opposite end of the poppet 29 located adjacent the outlet opening 24 of the valve body 12. When the adjusting ring 25 is positioned at the minimum setting as shown in the FIG. 2, the cross-sectional area through which the thermoplastic material can flow from the inlet opening 19 into the grooves 33 is relatively restricted and, therefore, such flow is at a minimum rate or volume. When the adjusting ring 25 is at the maximum setting as shown in the FIG. 3, the cross-sectional area is increased thereby permitting a larger volume flow from the inlet opening 19 through the grooves 33. Such flow is in the direction of the arrows 34 from the inlet opening 19 to the outlet opening 24.

Figure 5:
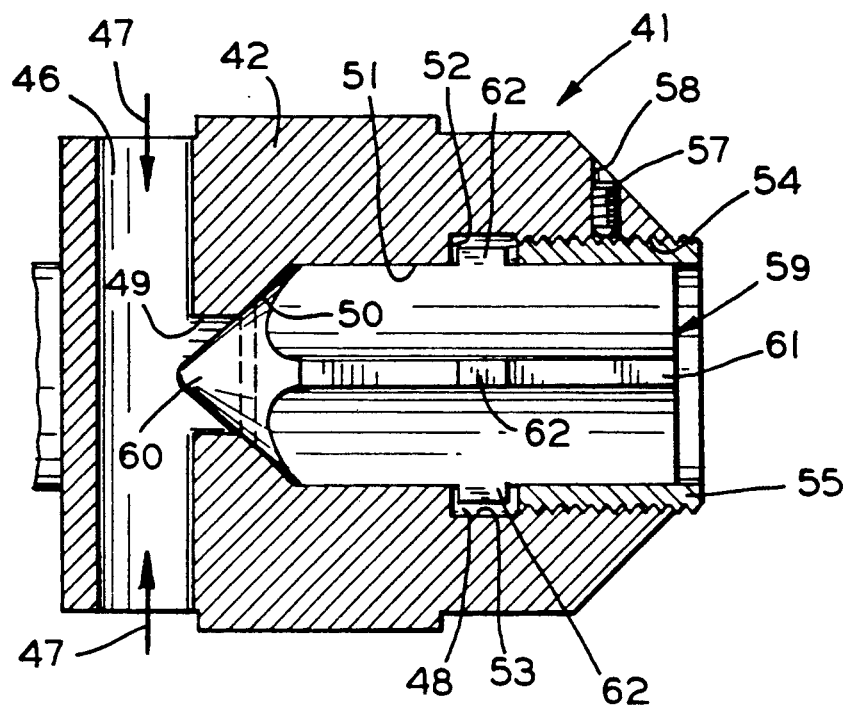
FIG. 5 is a front elevational view in cross section of an alternate embodiment of the poppet valve in accordance with the present invention in a closed position.
Figure 6:
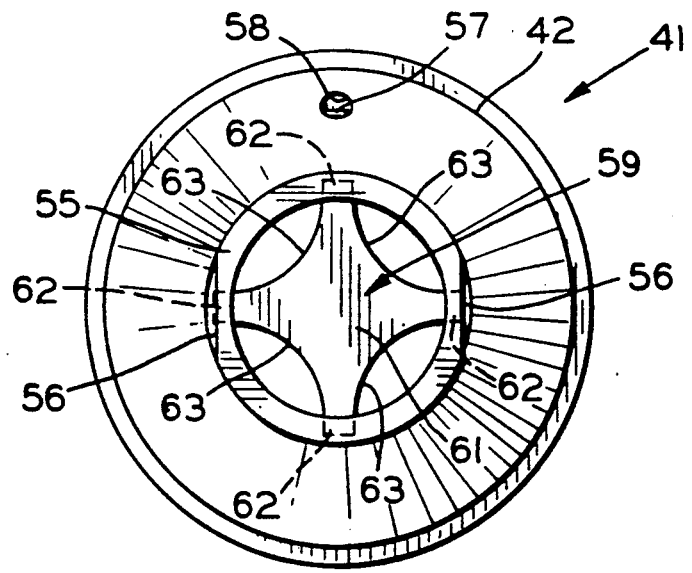
FIG. 6 is an end view of the outlet end of the valve shown in the FIG. 5.

There is shown in the FIGS. 5 and 6, an alternate embodiment of the valve according to the present invention. A non-return check valve 41 has a valve body 42. An inlet end of the valve body 42 is provided with a radially extending passageway 46 into which thermoplastic material flows in the direction of arrows 47 supplied from a feedscrew (not shown). The valve body 42 has formed therein an axially extending chamber 48 having a smaller diameter inlet opening 49 connected to the passageway 46. The chamber 48 also includes a taper portion 50 which expands outwardly and toward an outlet opening from the inlet opening 49. The taper portion 50 joins a poppet bore 51 which extends to a centrally located step 52 formed in the chamber 48. The step 52 connects the smaller diameter poppet bore 51 with a larger diameter ring bore 53 extending to an outlet opening 54. The major portion of the ring bore 53 from the outlet opening 54 toward the step 52 is internally threaded to threadably retain an externally threaded adjusting ring 55.

The adjusting ring 55 has a pair diametrically opposed flats 56 formed on an external surface for engagement by a pair of spaced apart arms of a conventional Y-shaped wrench (not shown) which is utilized to move the adjusting ring between minimum and maximum settings in a manner similar to the adjusting ring 25 of the valve 11. When the adjusting ring 55 is in the desired position, a set screw 57 engages the threaded external surface of the adjusting ring 55 through a threaded aperture 58 formed in the valve body 42. The valve 41 is provided with a poppet 59 having a conical inlet end 60 which cooperates with the taper portion 50 of the chamber 48. The poppet 59 also has a generally cylindrical central body 61 extending from the conical inlet end 60 adjacent to the outlet opening 54. A plurality of radially extending tabs 62 are formed on the external surface of the central body 61 for cooperation with the adjusting ring 55 to determine the minimum and maximum travel of the poppet 59 in the chamber 48. The central body 61 is also provided with a plurality of axially extending grooves 63 which permit the flow of thermoplastic material past the poppet 59 when the valve is in the open position.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A check valve for use in controlling the flow of thermoplastic material in an injection molding apparatus comprising:
 a valve body having an axially extending chamber formed therein, said chamber having an inlet opening and an outlet opening and an internal thread extending inwardly from said outlet opening;
 a poppet slidably movable in said chamber between a valve closed position and a selected valve open position, said poppet having an inlet end sealingly cooperating with said inlet opening for preventing flow of material through said chamber when said poppet is in the valve closed position; and an adjusting ring positioned in said chamber and being externally threaded for engaging said chamber internal thread for selective movement between a minimum open position and a maximum open position, said poppet abutting said adjusting ring in the selected valve open position whereby the volume of flow of material through said chamber is proportional to the position of said adjusting ring in said chamber.

2. The valve according to claim 1 wherein said poppet inlet end has a conical shape and said valve body chamber has a complementary taper portion.

3. The valve according to claim 1 wherein said adjusting means includes means for rotating said adjusting means relative to said valve body.

4. The valve according to claim 3 wherein said means for rotating includes a pair of diametrically opposed axially extending apertures formed in an end of said adjusting ring for engagement by a wrench.

5. The valve according to claim 3 wherein said means for rotating includes a pair of diametrically opposed flats formed on an exterior surface end of said adjusting ring for engagement by a wrench.

6. The valve according to claim 1 wherein said poppet has at least one axially extending groove formed therein for permitting the flow of material from said inlet end of said poppet to an opposite end of said poppet and out said outlet end of said chamber.

7. The valve according to claim 1 wherein said poppet has at least one radially extending tab formed thereon for abutting said adjusting ring when said poppet is in the selected valve open position.

8. A check valve for use in controlling the flow of thermoplastic material in an injection molding apparatus comprising:
- a valve body having an axially extending chamber formed therein, said chamber having an inlet opening and an outlet opening, said chamber having an internal thread extending inwardly from said outlet opening;
- a poppet slidably movable in said chamber between a valve closed position and a selected valve open position, said poppet having an inlet end sealingly cooperating with said inlet opening for preventing flow of material through said chamber when said poppet is in the valve closed position; and
- an adjusting ring positioned in said chamber for selective movement between a minimum open position and a maximum open position, said adjusting ring being externally threaded for threadably engaging said chamber internal thread, said poppet abutting said adjusting ring in the selected valve open position whereby the volume of flow of material through said chamber is proportional to the position of said adjusting ring in said chamber.

9. The valve according to claim 8 wherein said poppet inlet end has a conical shape and said valve body chamber has a complementary taper portion.

10. The valve according to claim 8 wherein said poppet has a plurality of axially extending grooves formed therein for permitting the flow of material from said inlet end of said poppet to an opposite end of said poppet and out said outlet end of said chamber.

11. The valve according to claim 8 wherein said poppet has at least one radially extending tab formed thereon for abutting said adjusting ring when said poppet is in the selected valve open position.

12. A check valve for use in controlling the flow of thermoplastic material in an injection molding apparatus comprising:
- a valve body having an axially extending chamber formed therein, said chamber having an inlet opening and an outlet opening, said chamber having an internal thread extending inwardly from said outlet opening;
- a poppet slidably movable in said chamber between a valve closed position and a selected valve open position, said poppet having an inlet end with a conical shape and said valve body chamber having a complementary taper portion adjacent said inlet opening, said inlet end and said taper portion sealingly cooperating for preventing flow of material through said chamber when said poppet is in the valve closed position; and
- an adjusting ring positioned in said chamber for selective movement between a minimum open position and a maximum open position, said adjusting ring being externally threaded for threadably engaging said chamber internal thread, said poppet abutting said adjusting ring in the selected valve open position whereby the volume of flow of material through said chamber is proportional to the position of said adjusting ring in said chamber, said poppet having a plurality of axially extending grooves formed therein for permitting the flow of material from said inlet end of said poppet to an opposite end of said poppet and out said outlet end of said chamber, and said poppet having a plurality of radially extending tabs formed thereon for abutting said adjusting ring when said poppet is in the selected valve open position.

* * * * *